May 18, 1965 K. F. KURZ 3,183,774
SLIDE PROJECTOR HAVING RECIPROCATING SLIDE CARRIER
Filed April 17, 1962 3 Sheets-Sheet 1
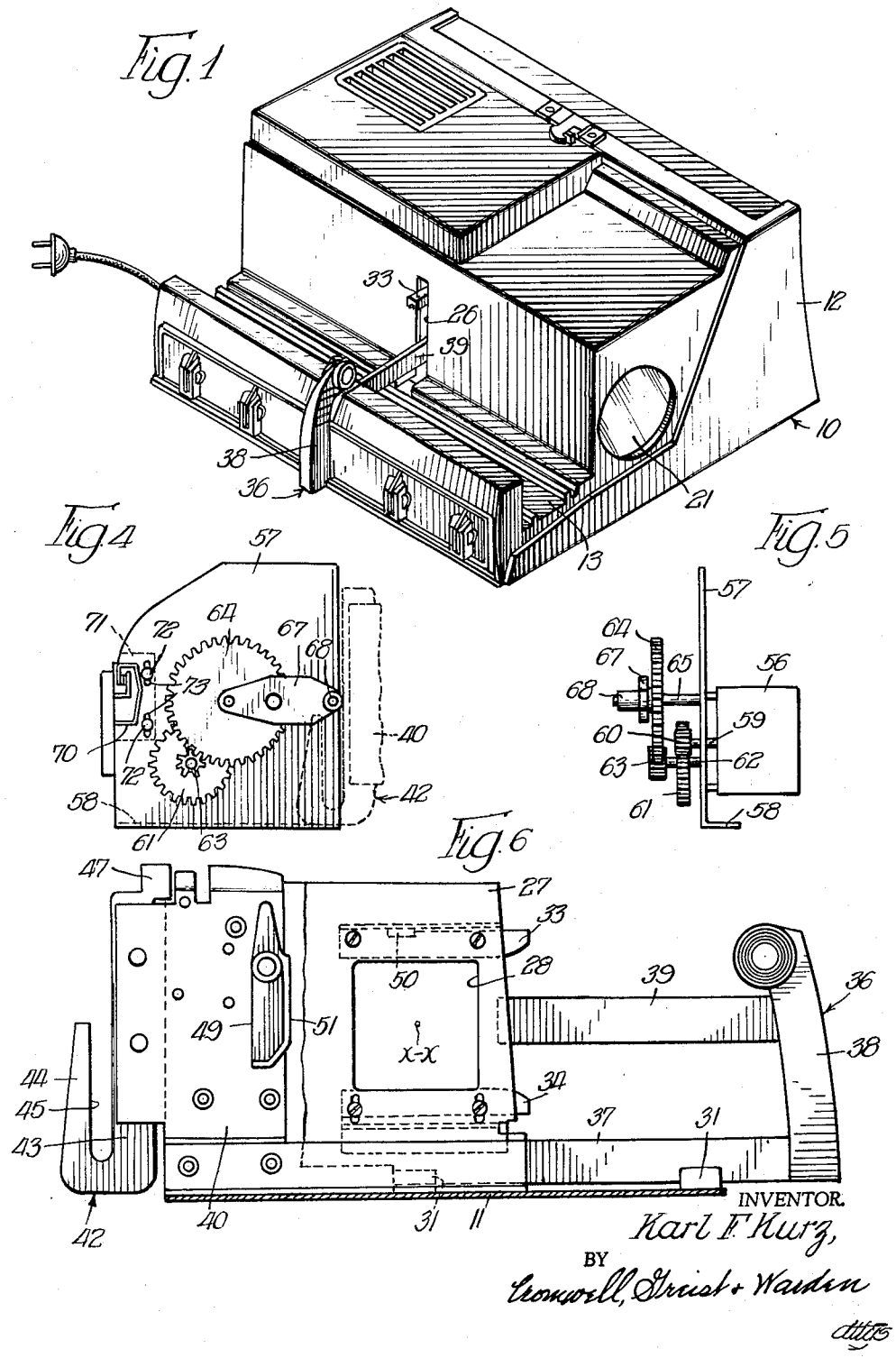
INVENTOR.
Karl F. Kurz,
BY
Cromwell, Griest + Warden

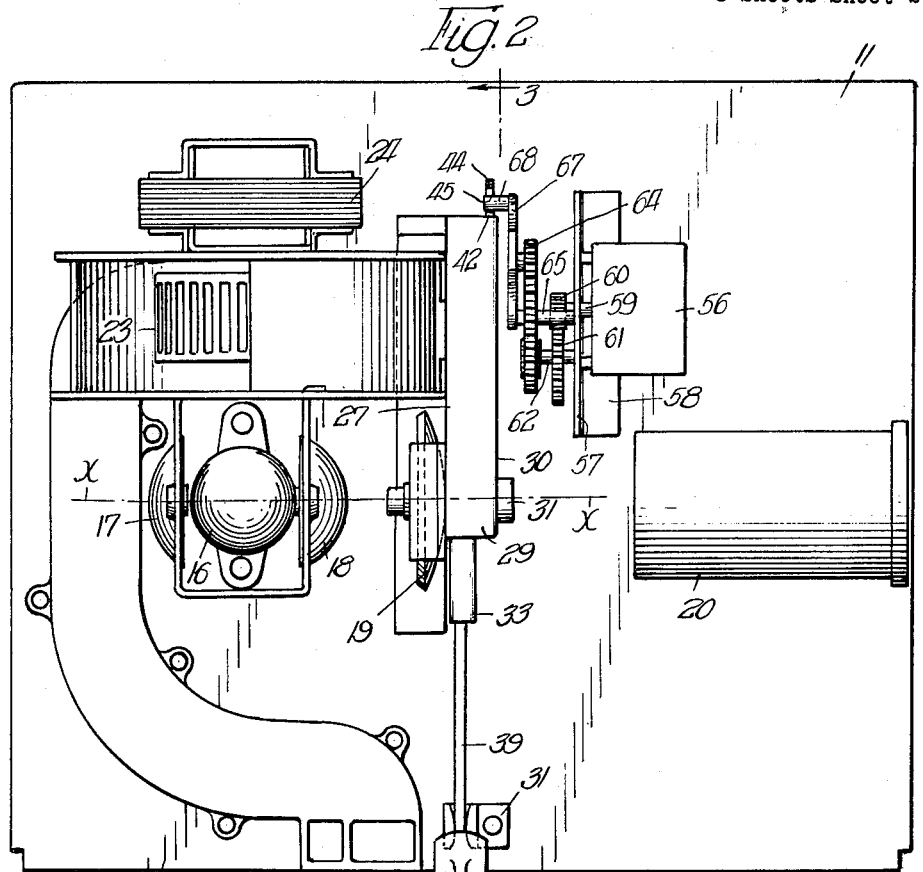
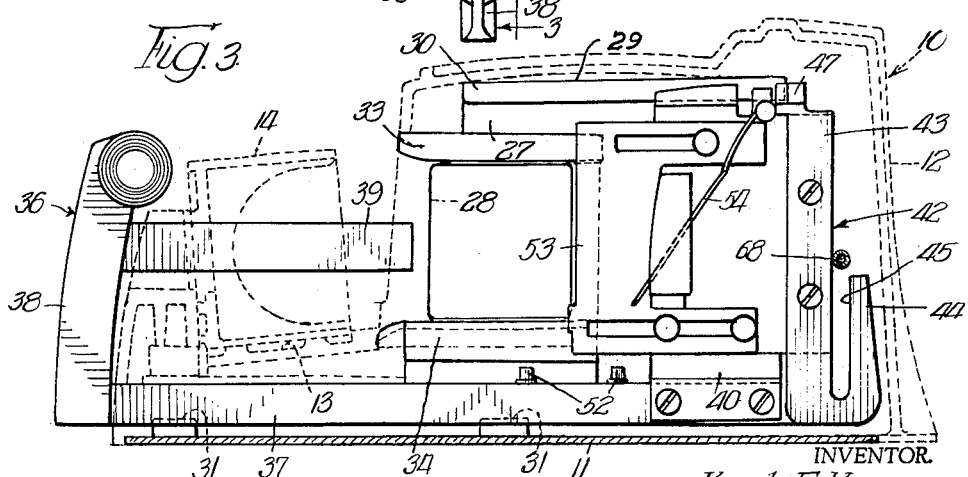

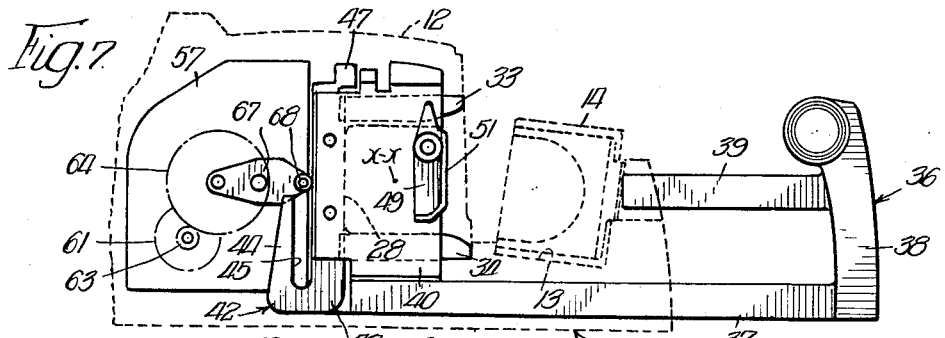
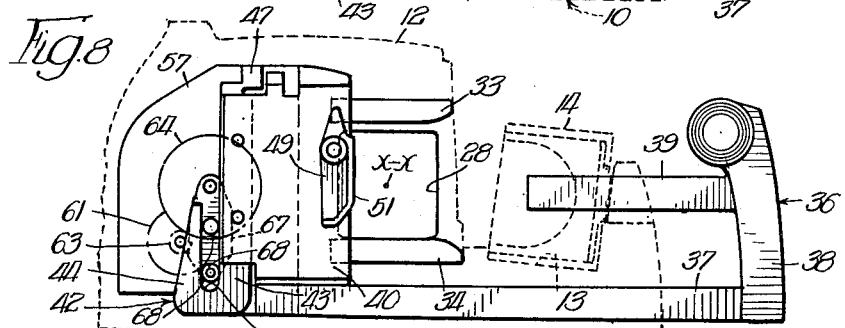
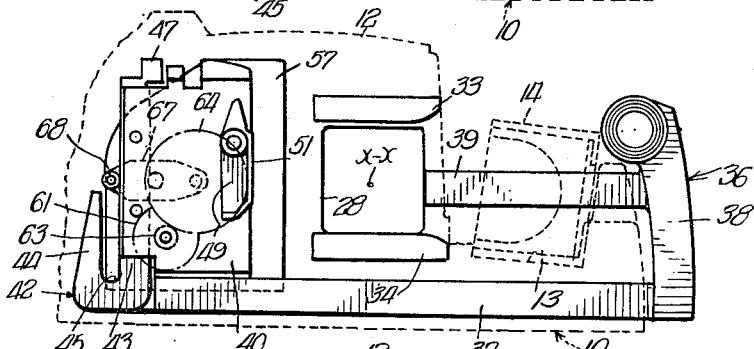
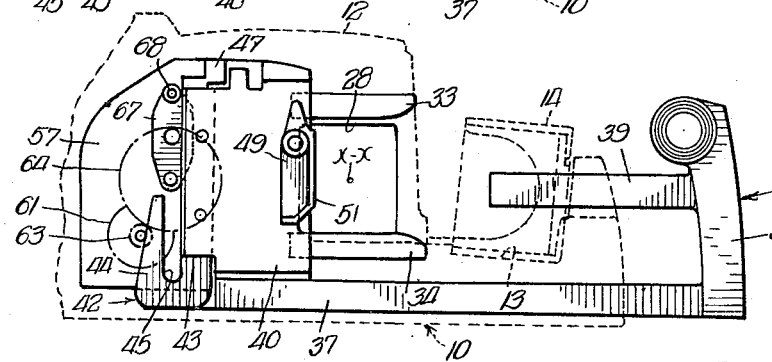

United States Patent Office 3,183,774
Patented May 18, 1965

3,183,774
SLIDE PROJECTOR HAVING RECIPROCATING SLIDE CARRIER
Karl F. Kurz, Portland, Oreg., assignor to Sawyers, Inc., Portland, Oreg., a corporation of Oregon
Filed Apr. 17, 1962, Ser. No. 188,107
7 Claims. (Cl. 88—28)

The present invention relates to slide projectors and, more particularly, to a slide projector having a slide carrier which is reciprocal in a direction transversely of the optical axis of the projector for advancing slides from a slide tray to a viewing position in the projector and then returning such slides to the slide tray.

It is a general object of the present invention to provide a new and improved slide projector of the character described.

Another important object of the present invention is to provide a new and improved slide projector of the character described wherein the slide carrier is automatically reciprocated by an electric cycle motor with the drive connection therebetween being characterized by a drive pin rotatable in a circular path by the motor and operably engaged in a vertical slot formed in one end of the slide carrier.

Another important object of the present invention is to provide a new and improved slide projector of the character described wherein a cycle motor stop switch is actuated by the slide carrier drive pin as the slide carrier reaches its innermost position upon transfer of a slide to a viewing position in the projector whereby to stop the cycle motor until such time that it is again energized, either manually or by an automatic timer device.

Certain other objects of the invention will, in part, be obvious, and will in part appear hereinafter.

For a more complete understanding of the nature and scope of the invention reference may now be had to the accompanying drawings wherein:

FIG. 1 is a perspective view of a projector embodying the invention;

FIG. 2 is a top plan view of the base plate of the projector with the upper casing portion thereof removed;

FIG. 3 is a vertical section taken generally on the line 3—3 of FIG. 2 with the upper casing portion of the projector and a slide tray being shown in broken line;

FIG. 4 is a rear elevational view of the slide carrier drive mechanism with the drive gear rotated 180° from its position in FIG. 2 and with the inner end of the slide carrier being shown in broken line;

FIG. 5 is a side elevational view of the drive mechanism shown in FIG. 4;

FIG. 6 is a partially broken rear elevational view of the aperture plate and the slide carrier;

FIG. 7 is a diagrammatic rear elevational view of the slide carrier and the drive mechanism therefor with the projector casing and a slide tray being shown in broken line and with the slide carrier being shown in its outermost position;

FIG. 8 is a diagrammatic rear elevational view similar to FIG. 7 with the slide carrier in its position midway between its outermost and innermost positions during the transfer of a slide from the slide tray to its viewing position in the projector;

FIG. 9 is a diagrammatic rear elevational view similar to FIGS. 7 and 8 with the slide carrier in its innermost position; and FIG. 10 is a diagrammatic rear elevational view similar to FIGS. 7, 8 and 9 with the slide carrier in its position midway between its innermost and outermost positions during the return of a slide to the slide tray.

The projector disclosed in the drawings is of the same general type as the projectors disclosed in co-pending applications, Serial No. 824,877, filed July 3, 1959, now Patent No. 3,120,150 and Serial No. 111,783, filed May 22, 1961, now Patent No. 3,130,637.

As best shown in FIGS. 1–3 inclusive, a preferred embodiment of the projector of the present invention includes a projector casing 10 including a base plate 11 and an upper casing portion 12 fitted thereover. The upper casing portion 12 is provided with a slide-tray-receiving channel or trough-like groove 13 which extends along one side thereof and is open at its top and at its forward and rear ends for receiving a known type slide tray 14 in which a plurality of slides or transparencies may be stored.

The optical axis of the projector is indicated by a broken line $x$—$x$ in FIGS. 2 and 6–10 and, as is well known in the art, a lamp 16, a reflector 17, lenses 18 and 19, and a focusing-lens-housing 20 including a focusing lens 21 are disposed in the projector casing 10 in alignment with the optical axis $x$—$x$ thereof. If desired, means may readily be provided, for instance, as fully disclosed in the previously mentioned co-pending application Serial No. 111,783, filed May 22, 1961 for manually or automatically and remotely varying the position of the focusing-lens-housing 20 forwardly and rearwardly for adjustment of the focus of the projector. A blower, including a fan wheel 23 and a drive motor 24 therefor, is provided for inducing a flow of air past the bulb 16 to substantially reduce the temperature within the projector casing 10 and thus prevent damage to the slides or transparencies being shown therein.

A vertically extending slide aperture 26 is formed in a portion of the upper casing portion 12 defining the inner wall of the groove 13 approximately midway between the front and rear ends of the projector casing 10 whereby to permit the transfer of slides from a slide tray 14 disposed in the groove 13 to a viewing position in the projector and return of a slide to the slide tray. A vertically disposed aperture plate 27 is mounted on the base plate 11 transversely of the optical axis $x$—$x$ of the projector and generally in alignment with the rear edge of the slide aperture 26. The aperture plate 27 is provided with a generally square slide viewing aperture 28 which is approximately the same size as the slides to be projected with the geometric center of the aperture 28 being aligned with the optical axis $x$—$x$ of the projector. The upper edge of the aperture plate 27 is bent forwardly, as at 29, and then downwardly whereby to define a guide rail 30. A pair of guide blocks 31 formed of nylon, plastic or other suitable bearing material are secured to the base plate 11 immediately forward of the lower edge of the aperture plate 27 in spaced apart relationship by suitable fasteners for a purpose which will be evident hereinafter.

Upper and lower track members 33 and 34 having downwardly and upwardly opening V-shaped grooves, respectively, are mounted on the forward surface of the aperture plate 27 adjacent the upper and lower edges, respectively, of the aperture 28 formed therein, whereby to support a transparency or slide therebetween in register with the slide viewing aperture 28. Preferably, the upper track member 33 is rigidly secured to the plate 27 while the lower track member 34 is mounted thereon for resilient movement in a vertical direction in a manner fully disclosed in co-pending application Serial No. 824,877, filed July 3, 1959, whereby to accommodate slightly oversize slides or transparencies.

A slide carrier 36 is mounted for reciprocable sliding movement transversely of the optical axis $x$—$x$ and is adapted for transferring slides between a slide tray 14 positioned in the groove 13 and the viewing aperture 28 in the projector. The slide carrier 36 is characterized by an elongated bar member 37 supported for sliding movement by the guide blocks 31, a handle member 38 which extends upwardly from the outer end of the bar member 37, a pusher arm 39 which extends inwardly from the upper end of the handle member 38 toward the optical axis x—x of the projector in parallel spaced arrangement above the bar member 37, and by a vertically disposed plate member 40 which is secured by suitable fastening means to the opposite end of the bar member 37. A generally flat J-shaped member 42, formed of nylon, or some other suitable material, has its longest vertical leg or element 43 secured to the forward surface of the plate member 40 along the outer edge thereof with its shortest vertical leg or element 44 being spaced away from the outer edge of the plate 40 whereby to define a vertically extending slot 45 disposed closely adjacent to the outer edge of the plate 40. The upper end of the longest vertical element 43 of the J-shaped member 42 is provided with an integral offset lug configuration 47 for guiding engagement with the guide rail 30 provided on the aperture plate 27. With the slide carrier 36 slidably and guidingly supported by the nylon guide blocks 31 and the nylon guide lug 47, the slide carrier 36 is reciprocable in a manner which contributes to noiseless operation of the projector. It is noted that the elongated bar member 37 of the slide carrier 36 is disposed wholly below the bottom surface of the slide-tray-receiving groove 13 and it and the pusher arm 39 extend through suitable slots or grooves formed in the upper casing portion 12 defining the outer wall of the slide-tray-receiving groove 13.

When the slide carrier 36 is moved inwardly from its outermost position (FIG. 7), the innermost end of the pusher arm 39 engages a slide stored in the slide tray 14 so as to transfer the slide from the slide tray through the vertical slide aperture 26 to a viewing position in the projector wherein the slide is in register with the slide viewing aperture 28 formed in the aperture plate 27. The slide is transferred from the slide tray to its viewing position in the projector at the same rate of movement as that of the inward movement of the slide carrier 36.

The slide is returned to the slide tray 14 from its viewing position in the projector upon outward movement of the slide carrier 36 from its innermost position (FIG. 9) by a flipper arm 49 which is pivotally mounted intermediate its ends on the rear surface of the plate member 40 secured to the end of the elongated bar member 37 of the slide carrier 36. A projecting member or ear 50 projects forwardly from the upper track member 33 and is adapted to be engaged by the upper end of the flipper member 49, which member 49 normally hangs in a vertical position due to the fact that the lower portion thereof has a greater mass than the upper end portion, during a portion of the outward movement of the slide carrier 36. The edge of the lower portion of the flipper arm 49 which is engageable with the slides in returning them to the slide tray 14 is provided with a broadened slide-engaging surface 51.

As is fully disclosed in the previously mentioned co-pending application Serial No. 824,877, filed July 3, 1959, each slide is returned to the slide tray during the portion of the outward movement of the slide carrier 36 in which the ear 50 is engaged by the upper end of the flipper arm 49 at a rate of movement which is substantially greater than the corresponding outward rate of movement of the slide carrier 36. The foregoing arrangement is such that the innermost end of the pusher arm 39 clears the inner surface of the outer wall of the slide tray 14 by the time the slide abuts thereagainst. Simultaneously with the slide being fully returned to its position in the slide tray, the upper end of the flipper arm 49 passes by and is disengaged from the projecting ear 50 whereby the flipper arm is permitted to swing into its normal vertically disposed position in which it is not only disengaged from the slide but is also spaced a sufficient distance therefrom to permit unhindered indexing movement of the slide tray in the groove 13 to position the next slide for transfer to the viewing position in the projector upon the next inward movement of the slide carrier 36.

Although not shown and described in detail, the projector of the present invention is preferably provided with a reversible slide-tray-indexing mechanism of the type fully disclosed in the previously identified co-pending applications Serial No. 824,877, filed July 3, 1959, and Serial No. 111,783, filed May 22, 1961. Such an indexing mechanism is automatically actuated during the final portion of each outward movement of the slide carrier 36 whereby to index the slide tray one position either forwardly or rearwardly of the projector and thus position the next slide in alignment for transfer to its viewing position in the projector upon the next inward movement of the slide carrier 36. The indexing mechanism is positively actuated by a pair of pins 52 (FIG. 3) mounted on the elongated bar member 37 of the slide carrier 36 during each outward movement thereof.

As best illustrated in FIG. 3, a shutter member 53 is mounted on the front surface of the plate 40 carried on the slide carrier 36 for sliding movement in a horizontal direction relative to the plate 40. The shutter member 53 is resiliently urged in a direction toward the optical axis x—x of the projector by an elongated wire spring member 54 whereby to automatically prevent the passage of light through the focusing lens 21 during the transfer of slides between a slide tray 14 and the viewing aperture 28. This shutter arrangement is fully disclosed in the previously identified co-pending application, Serial No. 111,783, filed May 22, 1961.

The slide carrier 36 is automatically reciprocated by a drive arrangement which will now be described. As best illustrated in FIGS. 2, 4, 5 and 7–10, this drive arrangement includes an electric cycle motor 56 which is disposed in the projector casing 10 forwardly of the path of movement of the slide carrier 36 and spaced from the optical axis x—x of the projector on the side thereof opposite from the slide-tray-receiving groove 13. The cycle motor 56 is supported on an upstanding plate member 57 which has a lower flange portion 58 secured to the base plate 11 in a suitable manner. The cycle motor 56 has a drive shaft 59 which extends rearwardly through an opening in the plate 57 and which has a small gear 60 secured on the rear end thereof and meshed in driving engagement with a larger gear 61. The gear 61 is secured on a shaft 62 which is rotatably supported in a suitable manner on the plate 57, which shaft 62 also has a smaller gear 63 secured on the end thereof rearwardly of the gear 61. The gear 63 is meshed in driving engagement with a drive gear 64 which is rotatably mounted on a shaft 65 which is suitably supported by the plate 57 at a point thereon such that the axis of rotation of the drive gear 64 is horizontally aligned with the optical axis x—x of the projector and is spaced a distance therefrom which is approximately equal to the length of the path of movement of the slide carrier 36 either inwardly or outwardly of the projector.

A radially extending arm 67 is secured on the rear face of the drive gear 64 and has a rearwardly projecting roller-type drive pin 68 mounted on the outer end thereof at a radial distance from the axis of rotation of the drive gear 64 which is approximately equal to one-half the length of the path of movement of the slide carrier 36 either inwardly or outwardly of the projector during its cycle of operation. The drive pin 68, which is rotatable in a circular path during operation of the cycle motor 56, is of a size such that it is adapted to be received in the vertically extending slot 45 defined by the J-shaped member 42 whereby to reciprocate the slide carrier 36 in a manner to be described. The upper edge of the shortest vertical element 44 of the J-shaped member 42 is spaced slightly below the axis of rotation of the drive gear 64 so that a slight clearance is provided between it and the lowermost portion of the roller drive pin 68 when the drive pin is horizontally aligned with the axis of rotation of the drive gear 64 for a purpose to be described hereinafter. The vertical slot 45 extends downwardly from the upper edge of the shortest vertical element 44 of the J-shaped member 42 to a point below the lowermost position of the drive pin 68.

The automatic reciprocation of the slide carrier 36 may best be described with reference to FIGS. 7-10. In the embodiment of the invention illustrated, it is noted that the cycle motor 56 is arranged to rotate the drive gear 64 in a clockwise direction, as viewed from the rear of the projector in FIGS. 4 and 7-10. In operation, the cycle motor 56 is energized by a cycle start switch (not shown) of a type well known in the art when the slide carrier 36 is in its innermost position, as illustrated in FIG. 9, whereby to initiate operation of the slide carrier 36 of the projector. As illustrated, the drive pin 68 is in its position furthest from the optical axis x—x of the projector and in horizontal alignment with the axis of rotation of the drive gear 64 with its inner surface disposed against the outer edge of the longest vertical element 43 of the J-shaped member 42 and slightly above the upper edge of the shortest vertical element 44 of the J-shaped member 42. As the drive gear 64 is rotated in a clockwise direction, as viewed in FIGS. 7-10, the slide carrier 36 is moved outwardly as a result of the bearing engagement of the drive pin 68 against the outer edge of the longest vertical element 43 of the J-shaped member 42. In FIG. 10, the drive pin 68 is in its uppermost position whereby the slide carrier 36 is in a position approximately midway between its innermost and outermost positions.

When the drive pin 68 reaches its position nearest to the optical axis x—x of the projector, as illustrated in FIG. 7, the slide carrier 36 has reached its outermost position and the slide tray 14 has been automatically indexed one position by the aforementioned slide-tray-indexing mechanism. As the drive pin 68 swings downwardly and away from the optical axis x—x, it enters the vertical slot 45 provided in the J-shaped member 42 and moves the slide carrier 36 inwardly from its outermost position as a result of the drive pin's bearing engagement against the inner edge of the shortest vertical element 44 of the J-shaped member 42 whereby to transfer a slide from a slide tray 14 to its viewing position in register with the viewing aperture 28. In FIG. 8, the drive pin 68 is in its lowermost position near the bottom of the slot 45 and the slide carrier 36 has reached a point midway between its outermost and innermost positions. The slide transfer cycle is completed when the drive pin 68 reaches its initial position, FIG. 9, wherein it is spaced furthest from the optical axis x—x of the projector, the drive pin 68 having moved slightly above the upper edge of the shortest vertical element 44 of the J-shaped member 42.

It is believed obvious that if the drive gear 64 were driven in a counter clockwise direction, as viewed from the rear of the projector, it would be necessary to mount the J-shaped member 42 in an inverted position on the plate 40 for proper operation of the slide carrier 36.

As it is necessary for viewing purposes to provide a dwell period while each slide is in register with the viewing aperture 28, a normally closed cycle motor stop switch 70 of a known type is mounted on the outer edge of the plate 57 in generally horizontal alignment with the axis of rotation of the drive gear 64 and in a position such that the normally closed switch 70 is actuated by the drive pin 68 as the drive pin 68 reaches the position shown in FIG. 9, wherein the slide carrier 36 is in its innermost position and a slide is in register with the viewing aperture 28, to open the power circuit to the cycle motor 56. The cycle motor stop switch 70 includes a mounting bracket 71 which is fitted against the front surface of the plate 57 and is mounted thereon for vertical adjustment by a pair of releasable fastener members 72 which extend through a pair of vertically elongated slots 73 formed in the plate 57, whereby to permit fine adjustment of the point at which the motor 56 is stopped.

Thus, when the cycle motor stop switch 70 is actuated by the drive pin 68 with the slide carrier 36 in its innermost position, the power circuit to the cycle motor 56 is opened in a manner well known in the art and movement of the slide carrier 36 then halted until such time that the cycle motor 56 is again energized either manually by a cycle motor start switch or by a timer-controlled switch (neither of which is shown). Previously identified pending application Serial 111,783, filed May 22, 1961, fully discloses the controls and circuitry for completely automatically and remotely controlling operation of the slide carrier including an automatic timer circuit for energizing the cycle motor after each slide has been in register with the slide viewing aperture for a predetermined time period. The projector shown in the drawings may, of course, be modified to incorporate any of these automatic and remote controls.

Referring again to FIG. 9, it is noted that because of the clearance provided between the upper edge of the shortest vertical element 44 of the J-shaped member 42 and the drive pin 68 when same is in its position furthest away from the optical axis x—x of the projector, the slide carrier 36 may also be reciprocated manually without the drive pin 68 interfering in any way with the reciprocal movement of the slide carrier 36 and particularly such movement of the J-shaped member 42.

All of the gears 60, 61, 63 and 64, the radial arm 67, the roller drive pin 68, and the J-shaped member 42, which elements include all of the interengageable motion transmitting parts of the slide carrier drive, are preferably formed of nylon whereby to contribute to noiseless reciprocal movement of the slide carrier 36 during automatic operation of the projector. It is noted that the drive pin 68 may, within the scope of the invention, be a solid pin formed integrally with the radial arm 67.

It will be understood that certain changes may be made in the construction or arrangement of the slide projector disclosed herein without departing from the spirit and scope of the invention as defined in the appended claims.

I claim:

1. In combination in a slide projector, a casing having a slide viewing aperture provided therein in alignment with the optical axis of the projector and a slide-tray-receiving groove extending along one side thereof, a slide carrier slidably mounted in said casing for reciprocating movement transversely of the optical axis, slide pushing means provided at the outer end of said slide carrier for transferring a slide from a slide tray disposed in the slide-tray-receiving groove to a viewing position in register with said slide viewing aperture upon inward movement of said slide carrier, an upstanding plate member mounted on the opposite end of said slide carrier and having a generally vertical outer edge, a slide-engaging flipper arm pivotably mounted on said plate member and operable during a portion of the outward movement of said slide carrier to return a slide to the slide tray at a faster rate of movement than the corresponding return rate of movement of said slide carrier, an electric cycle motor mounted in said casing on the opposite side of the optical axis from said slide-tray-receiving groove and forwardly of the path of movement of said slide carrier, a drive gear mounted adjacent said cycle motor for being driven by the latter through a gear train, a radial arm secured on the rear surface of said drive gear and having a radial length approximately equal to one-half the length of the path of movement of said slide carrier inwardly or outwardly of said casing, a rearwardly projecting cylindrical drive pin mounted on the outer end of said radial arm, vertically extending slot means provided on said outer edge of said upstanding plate of said slide carrier with said drive pin being engageable therein, whereby upon each revolution of said drive gear said slide carrier is moved both inwardly to transfer a slide from a slide tray to a position in register with said viewing aperture and outwardly to return a slide to the slide tray, and a cycle motor stop switch mounted in said casing adjacent said drive gear and adapted to be actuated by said drive pin at the end of each inward movement of said slide carrier.

2. In combination in a slide projector, a casing having a slide viewing aperture provided therein in alignment with the optical axis of the projector and a slide-tray-receiving groove extending along one side thereof, a slide carrier slidably mounted in said casing for reciprocating movement transversely of the optical axis, slide pushing means provided at the outer end of said slide carrier for transferring a slide from a slide tray disposed in the slide-tray-receiving groove to a viewing position in register with said slide viewing aperture upon inward movement of said slide carrier, an upstanding plate member mounted on the opposite end of said slide carrier and having a generally vertical outer edge, a slide-engaging flipper arm pivotably mounted on said plate member and operable during a portion of the outward movement of said slide carrier to return a slide to the slide tray at a faster rate of movement than the corresponding return rate of movement of said slide carrier, an electric cycle motor mounted in said casing on the opposite side of the optical axis from said slide-tray-receiving groove and forwardly of the path of movement of said slide carrier, a drive gear mounted adjacent said cycle motor for being driven by the latter through a gear train, a rearwardly projecting drive pin mounted on said drive gear at a point thereon spaced a radial distance from the axis of rotation thereof which is approximately equal to one-half the length of the path of movement of said slide carrier inwardly or outwardly of the casing, and a generally J-shaped member having its longest vertical element mounted on said outer edge of said upstanding plate member of said slide carrier and its shortest vertical element spaced outwardly therefrom whereby to define a vertically extending slot adapted to receive said drive pin during approximately one-half of each revolution thereof, whereby upon each revolution of said drive gear said slide carrier is moved both inwardly to transfer a slide from a slide tray to a position in register with said viewing aperture and outwardly to return a slide to the slide tray.

3. In combination in a slide projector, a casing having a slide viewing aperture provided therein in alignment with the optical axis of the projector and a slide-tray-receiving groove extending along one side thereof, a slide carrier slidably mounted in said casing for reciprocating movement transversely of the optical axis, slide pushing means provided at the outer end of said slide carrier for transferring a slide from a slide tray disposed in the slide-tray-receiving groove to a viewing position in register with said slide viewing aperture upon inward movement of said slide carrier, an upstanding plate member mounted on the opposite end of said slide carrier and having a generally vertical outer edge, a slide-engaging flipper arm pivotably mounted on said plate member and operable during a portion of the outward movement of said slide carrier to return a slide to the slide tray at a faster rate of movement than the corresponding return rate of movement of said slide carrier, an electric cycle motor mounted in said casing on the opposite side of the optical axis from said slide-tray-receiving groove and forwardly of the path of movement of said slide carrier, a drive gear mounted adjacent said cycle motor through a gear train, a radial arm secured on the rear surface of said drive gear and having a radial length approximately equal to one-half the length of the path of movement of said slide carrier inwardly or outwardly of said casing, a rearwardly projecting drive pin mounted on the outer end of said radial arm, a generally J-shaped member having its longest vertical element mounted on said outer edge of said upstanding plate member of said slide carrier and its shortest vertical element spaced outwardly therefrom whereby to define a vertically extending slot adapted to receive said drive pin during approximately one-half of each revolution thereof, whereby upon each revolution of said drive gear said slide carrier is moved both inwardly to transfer a slide from a slide tray to a position in register with said viewing aperture and outwardly to return a slide to the slide tray, and a cycle motor stop switch mounted in said casing adjacent said drive gear and adapted to be actuated by said drive pin at the end of each inward movement of said slide carrier whereby to stop said cycle motor with a slide in viewing position in the projector until said motor is again energized.

4. In combination in a slide projector, a casing having a slide viewing aperture provided therein in alignment with the optical axis of the projector and a slide-tray-receiving groove extending along one side thereof, a slide carrier slidably mounted in said casing for reciprocating movement transversely of the optical axis, slide pushing means provided at the outer end of said slide carrier for transferring a slide from a slide tray disposed in the slide-tray-receiving groove to a viewing position in register with said slide viewing aperture upon inward movement of said slide carrier, an upstanding plate member mounted on the opposite end of said slide carrier and having a generally vertical outer edge, a slide-engaging flipper arm pivotably mounted on said plate member and operable during a portion of the outward movement of said slide carrier to return a slide to the slide tray at a faster rate of movement than the corresponding return rate of movement of said slide carrier, an electric cycle motor mounted in said casing on the opposite side of the optical axis from said slide-tray-receiving groove and forwardly of the path of movement of said slide carrier, a drive gear mounted adjacent said cycle motor through a gear train, a rearwardly projecting drive pin mounted on said drive gear at a point thereon spaced a radial distance from the axis of rotation thereof which is approximately equal to one-half the length of the path of movement of said slide carrier inwardly or outwardly of said casing, a generally J-shaped member having its longest vertical element mounted on said outer edge of said upstanding plate member of said slide carrier and its shortest vertical element spaced outwardly therefrom whereby to define a vertically extending slot adapted to receive said drive pin, said drive gear being rotatable in a direction such that said drive pin during rotation thereof from its position closest to the optical axis of the projector to its position furthest therefrom is received in said slot and bears against the inner edge of said shortest vertical element of said J-shaped member whereby to move said slide carrier inwardly to transfer a slide from a slide tray to a position in register with said viewing aperture, said drive pin during its rotation from its position furthest from the optical axis of the projector to its position closest thereto bearing against the outer edge of said longest vertical element of said J-shaped member above said vertical slot defined therein whereby to move said slide carrier outwardly to return a slide to the slide tray, and a cycle motor stop switch mounted in said casing adjacent said drive gear and adapted to be actuated by said drive pin at the end of each inward movement of said slide carrier whereby to stop said cycle motor with a slide in viewing position in the projector.

5. In combination in a slide projector, a casing having a slide viewing aperture provided therein in alignment with the optical axis of the projector and a slide-tray-receiving groove extending along one side thereof, a slide carrier slidably mounted in said casing for reciprocating movement transversely of the optical axis, slide pushing means provided at the outer end of said slide carrier for transferring a slide from a slide tray disposed in the slide-tray-receiving groove to a viewing position in register with said slide viewing aperture upon inward movement of said slide carrier, an upstanding plate member mounted on the opposite end of said slide carrier and having a generally vertical outer edge, a slide-engaging flipper arm pivotally mounted on said plate member and operable during a portion of the outward movement of said slide carrier to return a slide to the slide tray at a faster rate of movement than the corresponding return rate of movement of said slide carrier, an electric cycle motor mounted in said casing on the opposite side of the optical axis from said slide-tray-receiving groove and forwardly of the path of movement of said slide carrier, a drive gear mounted adjacent said cycle motor for being driven by the latter through a gear train, a rearwardly projecting drive pin mounted on said drive gear at a point thereon spaced a radial distance from the axis of rotation thereof which is approximately equal to one-half the length of the path of movement of said slide carrier inwardly or outwardly of said casing, and a generally J-shaped member having its longest vertical element mounted on said outer edge of said upstanding plate member of said slide carrier and its shortest element spaced outwardly thereof whereby to define a vertically extending slot adapted to receive said drive pin, said slide carrier being reciprocated once during each revolution of said drive gear as a result of the operable engagement of said drive pin with said J-shaped member to return a slide to a slide tray from a viewing position in the projector upon outward movement of said slide carrier and to transfer a slide from the slide tray to the viewing position in the projector upon inward movement of said slide carrier, the upper end of said shortest vertical element of said J-shaped element being spaced slightly below said drive pin when same is horizontally aligned with the axis of rotation of said drive gear to permit manual reciprocation of said slide carrier without interference therewith by said drive pin.

6. In combination in a slide projector, a casing having a slide viewing aperture providing therein in alignment with the optical axis of the projector and a slide-tray-receiving groove extending along one side thereof, a slide carrier slidably mounted in said casing for reciprocal movement transversely of the optical axis, slide pushing means provided on the end of said slide carrier adjacent said groove for transferring a slide from a slide tray disposed in the slide-tray-receiving groove to a viewing position in registry with said slide viewing aperture upon inward movement of said slide carrier, an upstanding plate member mounted on the opposite end of said slide carrier and having a generally vertical outer edge, means on said slide carrier adjacent said opposite end thereof for returning a slide to a slide tray upon outward movement of said slide carrier, an electric motor mounted in said casing and a drive gear driven by the motor, which drive gear is mounted adjacent the path of movement of said opposite end of the slide carrier for rotation in a vertical plane transverse to said optical axis, a drive pin on said drive gear extending parallel with the axis of rotation of the latter and spaced a radial distance from said axis of rotation which is approximately equal to one-half the length of the path movement of said slide carrier in one direction thereof, and a generally J-shaped member having its longest vertical element mounted on said outer edge of the upstanding plate member and having its shortest element spaced outwardly from said longest vertical element for defining a vertically extending slot adapted to receive said drive pin during approximately one-half of each revolution of the drive gear, whereby upon each revolution of the drive gear the slide carrier is moved both inwardly to transfer a slide from a slide tray to a position in registry with said viewing apparatus and outwardly to return a slide to a slide tray.

7. In combination in a slide projector, a casing having a slide viewing aperture provided therein in alignment with the optical axis of the projector and a slide-tray-receiving opening extending along one side thereof, a slide carrier slidably mounted in said casing for reciprocal movement transversely of the optical axis, slide pushing means provided on the end of said slide carrier adjacent said opening for transferring a slide from a slide tray disposed in the slide-tray-receiving opening to a viewing position in registry with said slide viewing aperture upon inward movement of said slide carrier, first means on said slide carrier adjacent the opposite end thereof for returning a slide to a slide tray upon outward movement of said slide carrier, an electric motor mounted in said casing and a drive gear driven by the motor, which drive gear is mounted adjacent the path of movement of said opposite end of the slide carrier for rotation in a vertical plane transverse to said optical axis, a drive pin on said drive gear extending parallel with the axis of rotation of the latter and spaced a radial distance from said axis of rotation which is approximately equal to one-half the length of the path of movement of said slide carrier in one direction thereof, said drive gear being driven so that said drive pin is moved from the position thereof of greatest distance from said optical axis and returned to said position, and second means on said opposite end of said slide carrier including legs defining vertically extending, spaced, drive pin engageable edges, said edges being horizontally spaced in a plane parallel and contiguous with said plane so that the edge nearest said optical axis is engaged by the drive pin during movement of the latter away from said position and the other of said edges is engaged by the drive pin during movement of the latter toward said position, whereby said slide carrier is reciprocated transversely of the optical axis, said leg defining said other of said edges having a free end thereof clear of said drive pin when the latter is in said position thereby to permit manual operation of the slide carrier.

References Cited by the Examiner
UNITED STATES PATENTS 2,260,660 10/41 Darwin _____ 88—28
2,784,817 3/57 Lessman _____ 88—28 X OTHER REFERENCES
German application 1,077,891, March 1960.

NORTON ANSHER, *Primary Examiner.*
WILLIAM MISIEK, *Examiner.*

UNITED STATES PATENT OFFICE
CERTIFICATE OF CORRECTION

Patent No. 3,183,774 May 18, 1965

Karl F. Kurz

It is hereby certified that error appears in the above numbered patent requiring correction and that the said Letters Patent should read as corrected below.

Column 7, line 68 and column 8, line 35, after "motor", each occurrence, insert -- for being driven by the latter --; column 9, line 3, for "pivotally" read -- pivotably --.

Signed and sealed this 16th day of November 1965.

(SEAL)
Attest:

ERNEST W. SWIDER
Attesting Officer

EDWARD J. BRENNER
Commissioner of Patents